W. S. MAXEY.
WIRE CLOTH RACK.
APPLICATION FILED NOV. 17, 1908.
927,570.
Patented July 13, 1909.
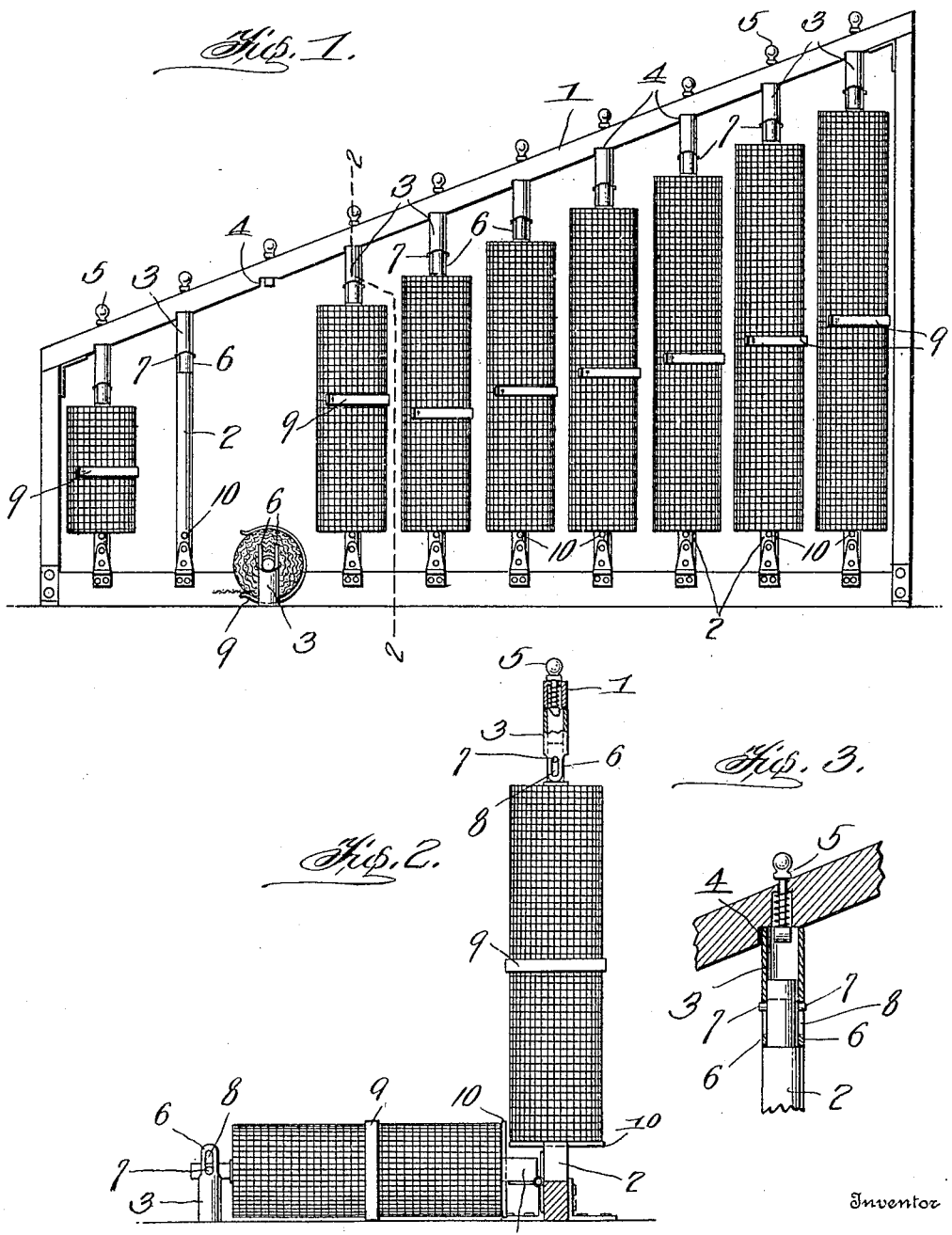

UNITED STATES PATENT OFFICE.

WILLIAM S. MAXEY, OF CALDWELL, IDAHO.

WIRE-CLOTH RACK.

No. 927,570.      Specification of Letters Patent.      Patented July 13, 1909.

Application filed November 17, 1908. Serial No. 463,098.

*To all whom it may concern:*

Be it known that I, WILLIAM S. MAXEY, a citizen of the United States, residing at Caldwell, in the county of Canyon and State of Idaho, have invented a new and useful Improvement in Wire-Cloth Racks, of which the following is a specification.

This invention is a rack designed especially for holding wire cloth used for window screens but the rack can be employed for holding any material which is put up in rolls and sold by the piece.

The invention consists of a frame holding a plurality of vertically arranged spools, each spool being hinged to the frame base, and provided with a hinged extension at its upper end which forms a supporting leg for the spool when thrown in horizontal position, together with means for locking the spool in vertical position in the rack.

The invention also consists in the novel features of construction hereinafter described, pointed out in the claims and shown in the accompanying drawings, in which, Figure 1 is a side elevation of my rack. Fig. 2 is a transverse section on the line 2—2 of Fig. 1, showing one of the spools thrown into horizontal position. Fig. 3 is a detail view partly in section, the upper portion of one of the spools and the locking means carried by the frame.

In constructing my device I employ an approximately triangular frame 1 to the base of which are hinged spools 2 for receiving the rolls of wire or other material. Each roll 2 is provided at its upper end with an extension 3 pivotally connected to the spool so that it can be swung at right angles thereto, and forming a supporting leg for the free end of the spool when the same is swung into horizontal position. The upper side of the frame 1 is notched as shown at 4 for the purpose of receiving the free ends of the extension 3, and locking bolts 5, similar to the usual spring bolts employed on doors, and windows, are carried by the top of the frame, working through the said top, and these bolts enter suitable recesses formed in the ends of the extension 3 thus locking the spools in upright position within the frame. In order to connect the extensions with the spool the pivoted end of the extension is cut away leaving projecting ears 6 which fit over the upper ends of the spool, said ends being flattened or reduced to receive said ears, and a pin 7 passes through the reduced portions of the spool and projects upon each side into slots 8 formed in the ears 6. When the spools are in upright positions the pin 7 rests in the lower ends of the slots 8, but when the spools are thrown into horizontal position the extension 3 is drawn away from the end of the spool the length of the slots, and can then be swung at right angles to the spool, turning on the pin 7 as a pivot point, and forms a supporting leg for the spool, the pin resting in the ends of the slots opposite the ends in which it rested when the spool was in vertical position. The spool is therefore held above the floor, being supported at one end by the base of the frame 1, and at the other end by the extension 3 so that the goods can be readily unrolled therefrom.

To hold the goods in tension while being drawn from the spool and to prevent unrolling of the goods when a piece has been cut therefrom, I provide a steel spring clip 9 and one of these clips is fitted upon each roll. I also pass through the lower portion of each spool at a short distance above its hinged end a pin 10 upon which the roll rests, and which prevents the roll from slipping down and covering the hinged connection between the spool and the frame 1.

What I claim is:

1. A substantially tri-angular shaped frame, spools hinged to the base of said frame, pivoted extensions carried by the upper ends of the spools, and means for locking said extensions to the upper side of the frame.

2. A frame consisting of a base and a top, a spool hinged to said base, an extension pivotally connected to the free end of the spool, said extension forming a supporting leg for the spool when the spool is swung into horizontal position, and a locking bolt carried by the top of the frame and engaging said extension.

3. A device of the kind described comprising a frame having a base and a top member, said top member being arranged at an angle to the base, spools hinged to said base, extensions pivoted to the free ends of the spools, the top of the frame being cut out to receive the free ends of the extensions, said free ends being recessed, and spring pressed bolts working through the frame top and engaging the recesses of the extensions.

4. A rack of the kind described comprising a frame, spools hinged to the frame, pivoted extensions carried by the spools, means carried by the frame for locking said extensions to the frame, the extensions being adapted to swing at right angles to the spool to form a supporting leg therefor, and a spring clip carried by each spool, as and for the purpose set forth.

5. A device of the kind described comprising a rack, a spool hinged at one end to the base of the rack, an extension loosely pivoted to the other end of the spool, the said extension being movable away from the end of the spool, and adapted to be turned at right angles to the spool, said extension engaging the top of the rack, when the end of the extension bears upon the end of the spool, and means for locking said extension to the rack.

WILLIAM S. MAXEY.

Witnesses:
 MARY REDWAY FLYNN,
 PLINY O. WILEY.